(12) United States Patent
Zhao

(10) Patent No.: US 11,998,867 B2
(45) Date of Patent: Jun. 4, 2024

(54) AIR FILTER HAVING PULLING ELEMENTS

(71) Applicant: Mingrong Zhao, Ottawa (CA)

(72) Inventor: Mingrong Zhao, Ottawa (CA)

( * ) Notice: Subject to any disclaimer, the term of this patent is extended or adjusted under 35 U.S.C. 154(b) by 111 days.

(21) Appl. No.: 16/563,878

(22) Filed: Sep. 8, 2019

(65) Prior Publication Data

US 2020/0086262 A1 Mar. 19, 2020

Related U.S. Application Data

(60) Provisional application No. 62/731,979, filed on Sep. 17, 2018.

(51) Int. Cl.
  B01D 46/10 (2006.01)
  B01D 46/00 (2022.01)
  B01D 46/42 (2006.01)

(52) U.S. Cl.
  CPC ......... *B01D 46/4227* (2013.01); *B01D 46/10* (2013.01)

(58) Field of Classification Search
  CPC .. B01D 46/10; B01D 46/008; B01D 46/0002; B01D 46/0005; B01D 46/4227
  USPC ............ 55/357, 495, DIG. 31; 210/237, 238
  See application file for complete search history.

(56) References Cited

U.S. PATENT DOCUMENTS

| | | | | |
|---|---|---|---|---|
| 2,289,009 A * | 7/1942 | Glesser | ................... | A47L 9/149 55/366 |
| 5,117,899 A * | 6/1992 | Skimehorn | ............. | F24F 3/052 165/119 |
| 6,200,465 B1 * | 3/2001 | Carawan | ............... | B01D 46/008 210/238 |
| 7,344,577 B2 * | 3/2008 | Berkhoel | ............. | B01D 46/008 210/237 |
| 8,613,785 B1 * | 12/2013 | Davis | ..................... | B01D 46/10 55/495 |
| 8,746,768 B1 * | 6/2014 | Coates | ............... | B01D 46/4227 294/118 |
| 2006/0137311 A1 * | 6/2006 | Sundet | ............... | B01D 46/4227 55/357 |
| 2006/0150589 A1 * | 7/2006 | Crow | ................. | B01D 46/4227 55/357 |

(Continued)

FOREIGN PATENT DOCUMENTS

WO      2018029576 A1    2/2018

OTHER PUBLICATIONS

3M Allergen Defense 1000 Air Filter.

(Continued)

*Primary Examiner* — Minh Chau T Pham

(57) ABSTRACT

An air filter includes a filter frame, a filter cloth, a plurality of wires, and one or more pulling elements directly attached to a surface of the filter frame. The air filter is characterized by an installed condition in which a majority portion of the air filter is disposed in a housing and an uninstalled condition in which another majority portion of the air filter is out of the housing. The one or more pulling elements facilitate a user's pulling the air filter out of the housing. The one or more pulling elements comprises a flap, a recess region, a thread, a split pin type pulling element, a patch, a loop, a letter L-shape dual hook tool, and a tool with a self lock tool. An other air filter is wider than a housing. A first member of a filter frame of the other air filter serves as a handle for a user to pull.

10 Claims, 11 Drawing Sheets

(56) References Cited

U.S. PATENT DOCUMENTS

| | | | | |
|---|---|---|---|---|
| 2011/0225939 A1* | 9/2011 | Loggins | ............ | B01D 46/0005 |
| | | | | 55/357 |
| 2013/0097979 A1* | 4/2013 | Mann | ................ | B01D 46/0005 |
| | | | | 55/357 |
| 2015/0007530 A1* | 1/2015 | Cho | ................ | F02M 35/02491 |
| | | | | 55/357 |
| 2015/0101296 A1* | 4/2015 | Ferreira | ................ | B01D 46/10 |
| | | | | 55/496 |
| 2015/0197883 A1* | 7/2015 | Masters | ................ | D06F 58/20 |
| | | | | 55/357 |
| 2019/0321768 A1* | 10/2019 | Englund | ............ | B01D 46/0091 |
| 2020/0061515 A1* | 2/2020 | Merton | ............ | B01D 46/0005 |

OTHER PUBLICATIONS

International fireboard case code, published by FRFCO and ESBO, 11th Edition, 2007. A copy is available at the website https://www.fefco.org/technical-information/fefco-code.
https://www.dustfree.com/products/air-filters/dust-fighter-95.

* cited by examiner

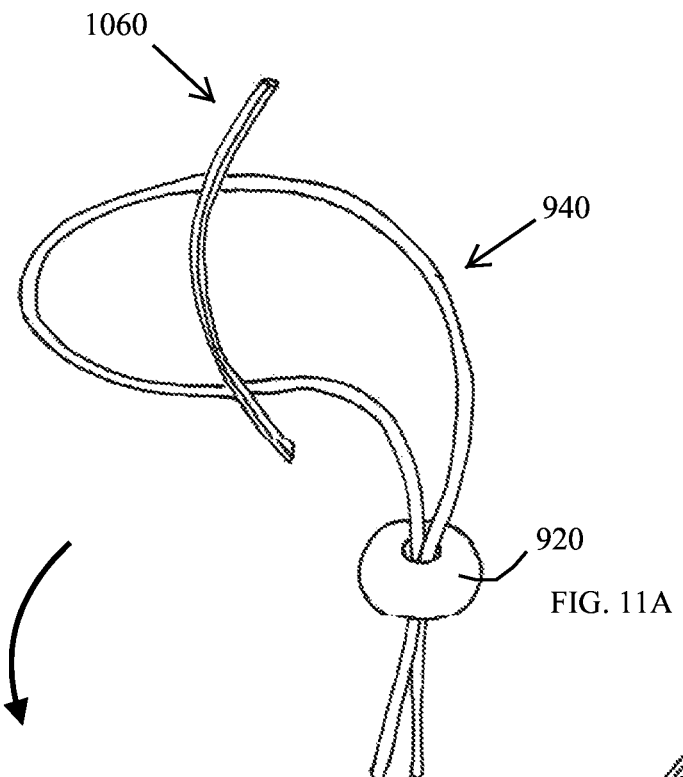
FIG. 11A
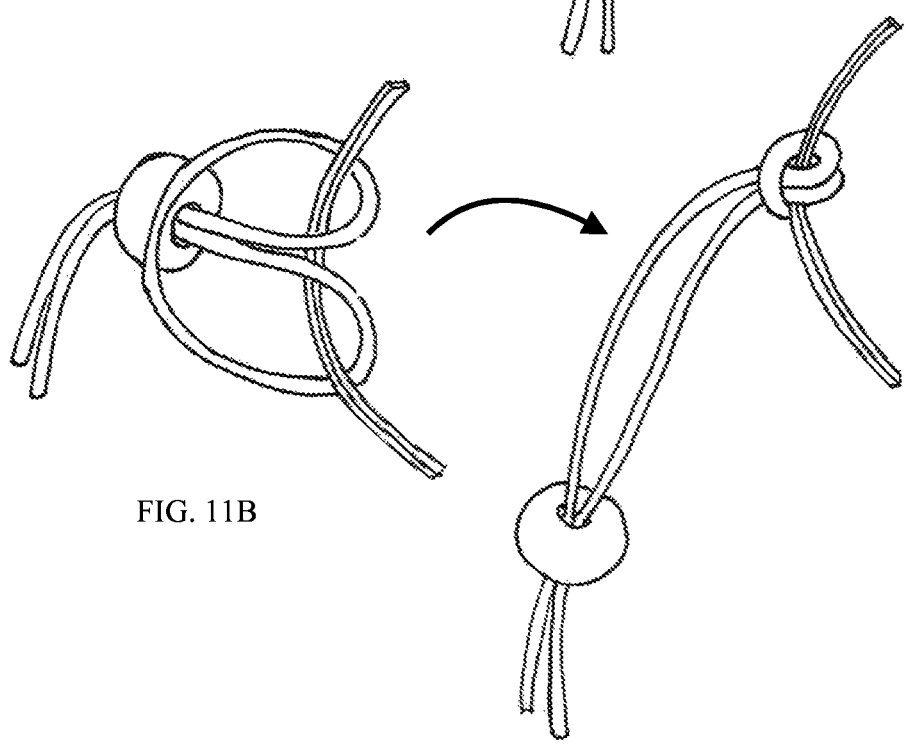
FIG. 11B
FIG. 11C

_US 11,998,867 B2_

AIR FILTER HAVING PULLING ELEMENTS

CROSS-REFERENCE TO RELATED APPLICATIONS

This patent application claims benefit of a provisional patent application 62/731,979 having a Filing Date of Sep. 17, 2018. The disclosure made in the provisional patent application 62/731,979 is hereby incorporated by reference.

FIELD OF THE INVENTION

This invention relates generally to an air filter. More particularly, the present invention relates to an air filter having pulling elements.

BACKGROUND OF THE INVENTION

It is very challenging to remove a conventional air filter, for a furnace, from a housing because a user usually only have access to a narrow surface of the conventional air filter. Thus, it is difficult for users to pick up the air filter and pull the air filter out after the air filter being installed into the housing. The contaminants are more likely to fall off when the user struggles to move an air filter out of the housing. This invention provides an effective and low-cost solution to this problem.

Advantages of the air filter of the present disclosure includes adding one or more pulling elements so that the air filter is easier to be removed from a housing. It is less likely to shake dust off. It avoids user frustration and saves processing time to replace air filters.

SUMMARY OF THE INVENTION

The present invention discloses an air filter comprising a filter frame, a filter cloth, a plurality of wires, and one or more pulling elements directly attached to a surface of the filter frame. The air filter is characterized by an installed condition in which a majority portion of the air filter is disposed in a housing and an uninstalled condition in which another majority portion of the air filter is out of the housing. The one or more pulling elements facilitate a user's pulling the air filter out of the housing. Most of furnaces have an air filter housing which is of a rectangular slot shape. The air filter housing holds the air filter inside the furnaces tightly to facilitate strong air flowing through. From the outside of furnace, there is only a narrow side surface (for example, length X by width Y by depth Z, X<Y, and Z is 5%-100% of Y) of air filter exposure to users.

The one or more pulling elements comprises a flap, a recess region, a thread, a split pin type pulling element, a patch, a loop, a letter L-shape dual hook tool, and a tool with a self lock tool.

BRIEF DESCRIPTION OF THE DRAWINGS

FIGS. 11A, 11B, and 11C show process steps of assembling the ball of FIG. 10 in examples of the present disclosure.

DETAILED DESCRIPTION OF THE INVENTION

Figure 1:
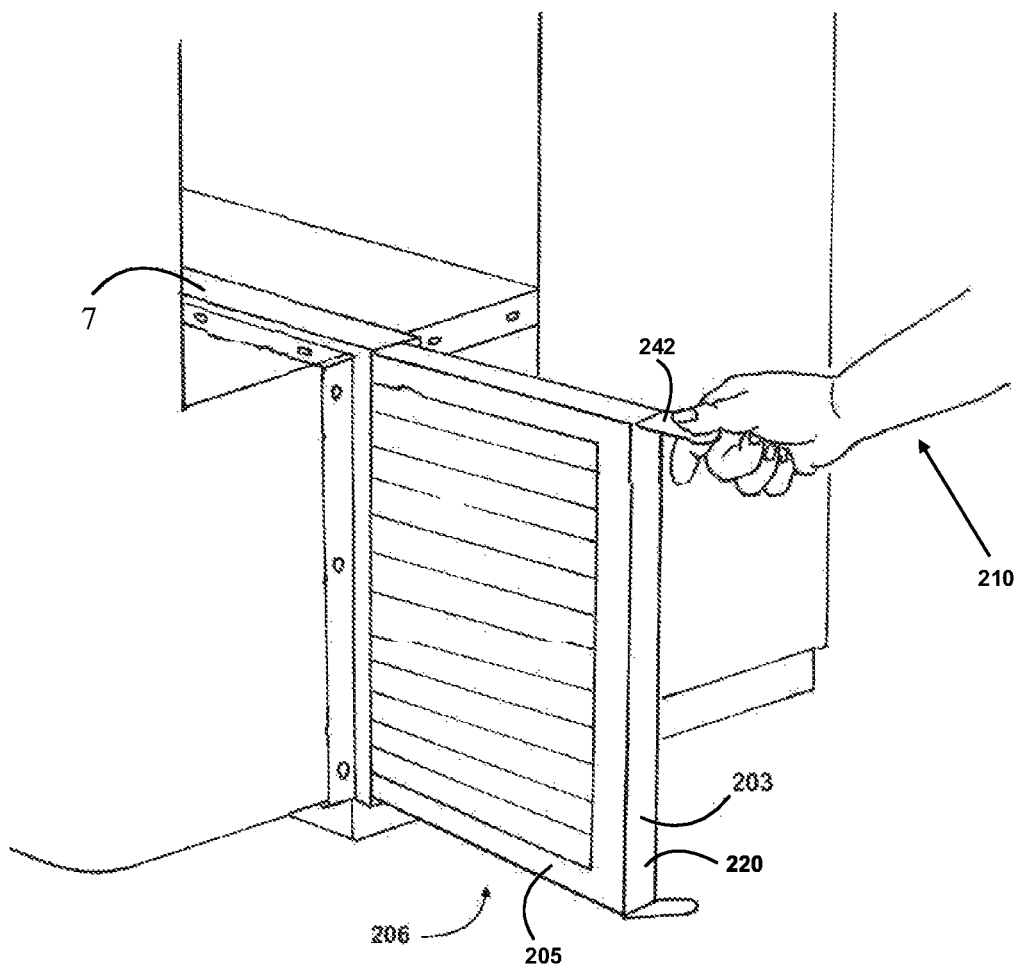
FIG. 1 is a partially perspective view of an air filter and a housing in examples of the present disclosure.

FIG. 1 is a partially perspective view of an air filter 206 and a housing 7 in examples of the present disclosure. A hand 210 of a user holds and pulls a flap 242 attached to a surface 203 of a first member 220 of a filter frame 205 of the air filter 206 so as to pull the air filter 206 out of the housing 7. The flap 242 is available for the user to pull even in the installed condition.

In examples of the present disclosure, in an installed condition, the air filter 206 is enclosed by the housing 7 except that the surface 203 is exposed from the surrounding housing 7.

Figure 2:
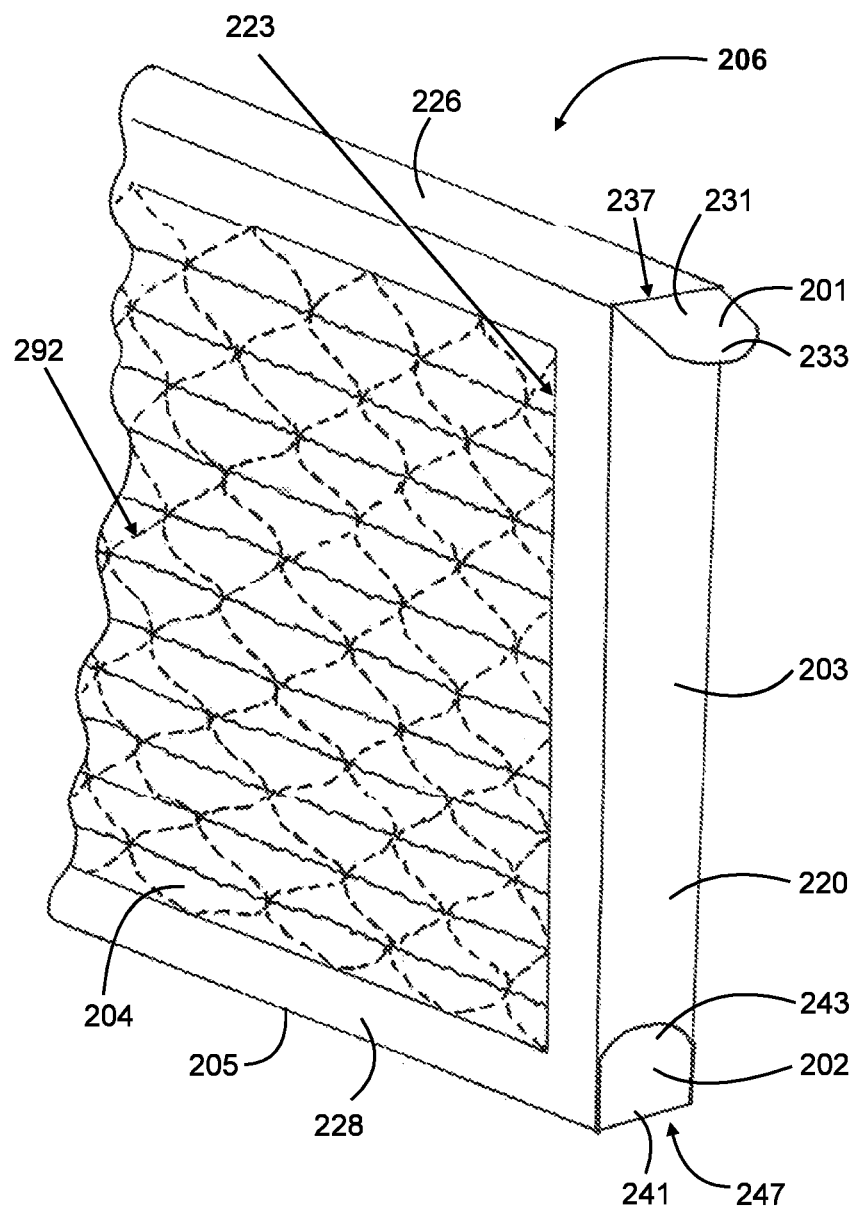
FIG. 2 is a partially perspective view of an air filter comprising two flaps in examples of the present disclosure.

FIG. 2 is a partially perspective view of an air filter 206 in examples of the present disclosure. The air filter 206 comprises a filter frame 205, a filter cloth 204, a plurality of wires 292 (shown in dashed lines because of being behind the filter cloth 204), a first flap 201 as a first pulling element, and a second flap 202 as a second pulling element. The filter frame 205 comprises a first member 220. The first member 220 comprises a first surface 203. In a packaged condition, while delivering the air filter 206 to a customer, the first flap 201 and the second flap 202 are folded. In FIG. 2, as an example, the bottom flap 202 is folded along the surface 203 and the upper flap 201 is flapped up. Both flaps 201 and 202 can be flapped up so as to be used as pulling elements to pull the air filter 206 out from the housing 7.

The shapes, locations, and the sizes of flaps 201 and 202 may vary. In examples of the present disclosure, the flaps 201 and 202 are made of a same material as the filter frame 205. In one example, the number of flaps attached to the surface 203 is one or two. In another example, the number of flaps attached to the surface 203 is three or more.

The air filter 206 is characterized by an installed condition and an uninstalled condition. In the installed condition, the air filter 206 is enclosed by a housing 7 of FIG. 1 except that the first surface 203 is exposed from the housing 7. In one example, the first surface 203 and the walls of the housing 7 are co-planer. In the uninstalled condition, at least a majority portion of the air filter 206 is pulled out of the housing 7. In one example, a majority portion is more than 50%.

In examples of the present disclosure, the filter cloth 204 is between a top member 226 of the filter frame 205 and a bottom member 228 of the filter frame 205. The plurality of wires 292 is between the top member 226 of the filter frame 205 and the bottom member 228 of the filter frame 205.

In examples of the present disclosure, the first flap 201 comprises a first top flap end portion 231 and a second top flap end portion 233. The second top flap end portion 233 is opposite to the first top flap end portion 231. The first top flap end portion 231 is directly attached to an interface 237 of a top surface of the top member 226 of the filter frame 205 and the first surface 203 of the first member 220 of the filter frame 205.

In examples of the present disclosure, the first flap 201 is characterized by a folded condition and an angled condition. In one example, the angled condition is in a range from 80 degrees to 100 degrees. In another example, the angled condition is in a range from 10 degrees to 180 degrees. In the folded condition, the second top flap end portion 233 contacts the first surface 203 of the first member 220 of the filter frame 205. In the angled condition, the second top flap end portion 233 does not contact the first surface 203 of the first member 220 of the filter frame 205. A hand of a user holds and pulls the second top flap end portion 233.

In examples of the present disclosure, the second flap 202 comprises a first bottom flap end portion 241 and a second bottom flap end portion 243. The second bottom flap end portion 243 is opposite to the first bottom flap end portion 241. The first bottom flap end portion 241 is directly attached to an interface 247 of a bottom surface of the bottom member 228 of the filter frame 205 and the first surface 203 of the first member 220 of the filter frame 205.

In examples of the present disclosure, the second flap 202 is characterized by a folded condition and an angled condition. In one example, the angled condition is in a range from 80 degrees to 100 degrees. In another example, the angled condition is in a range from 70 degrees to 110 degrees. In the folded condition, the second bottom flap end portion 243 contacts the first surface 203 of the first member 220 of the filter frame 205. In the angled condition, the second bottom flap end portion 243 does not contact the first surface 203 of the first member 220 of the filter frame 205. Another hand of the user holds and pulls the second bottom flap end portion 243.

Figure 4A:
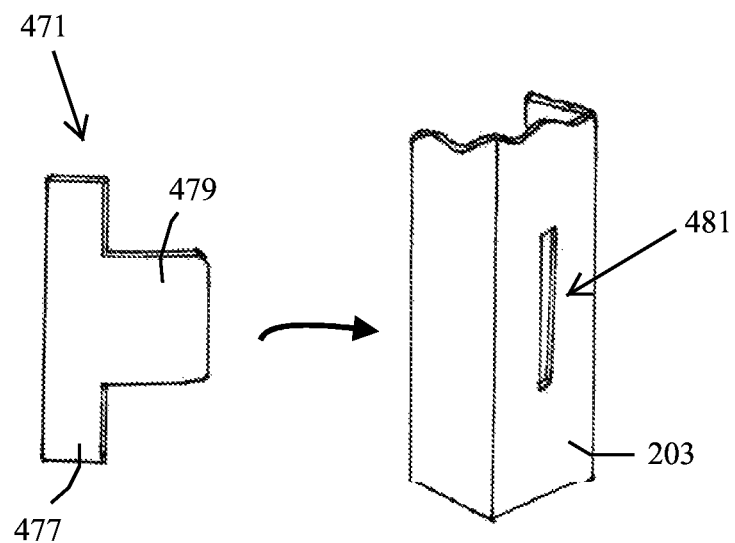
FIGS. 4A and 4B show a perspective view of a T shape flap and a slot in examples of the present disclosure.
Figure 4B:
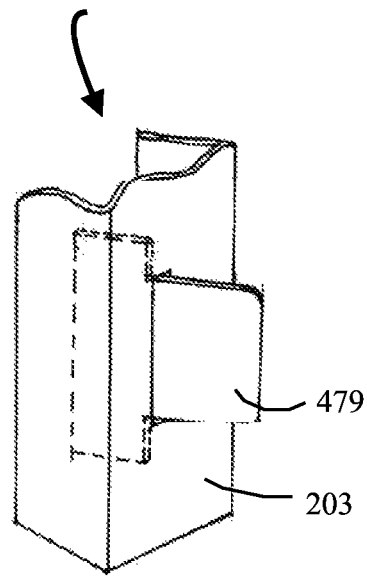

In one example, the filter frame 205, the first flap 201, and the second flap 202 are a single piece construction. The filter frame 205, the first flap 201, and the second flap 202 may be made in a same, single manufacturing process, for example, a cardboard frame packaging process. In another example, the filter frame 205 and the first flap 201 are dual-piece construction. The filter frame 205 and the first flap 201 are separately formed. The first flap 201 is then attached to the filter frame 205 (for example, a T shape flap 471 of FIG. 4 extends from inside to outside of the air filter through a line-shape opening cut 481 along the interface or on surface of 203. The wider part 477 of T shape flap 471, wider than the line-shape opening cut 481, will hook it with air filter frame, thus the narrow part 479 of T shape flap 471 can play a role like flap 242 in FIG. 1). The filter frame 205 and the second flap 202 are dual-piece construction. The filter frame 205 and the second flap 202 are separately formed. The second flap 202 is then attached to the filter frame 205 (for example, through a hinge similar to a door hinge).

Figure 3:
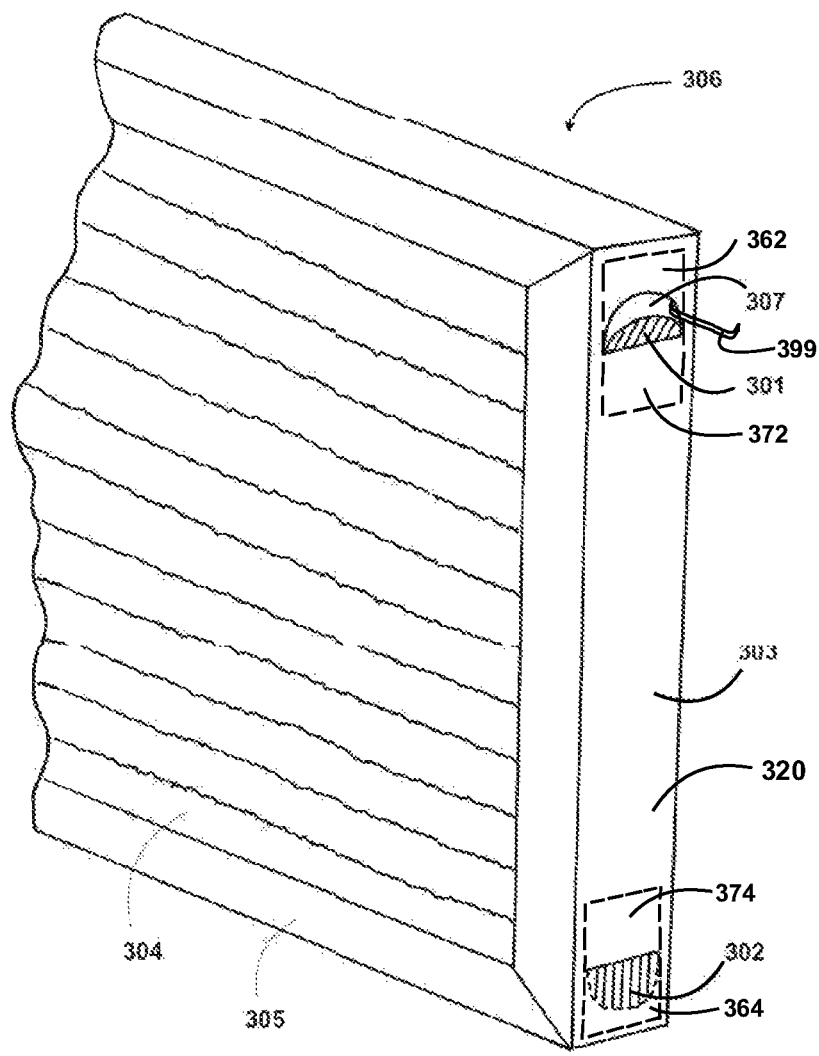
FIG. 3 is a partially perspective view of an air filter comprising two perforated flaps in examples of the present disclosure.

FIG. 3 is a partially perspective view of an air filter 306 comprising two perforated flaps 301 and 302 in examples of the present disclosure. The air filter 306 comprises a filter frame 305, a filter cloth 304, a plurality of wires 292 of FIG. 2, a first flap 301, and a second flap 302. The filter frame 305 comprises a first member 320. The first member 320 comprises a first surface 303.

In one example, flaps 301 and 302 are of a semi-circle shape. In FIG. 3, the bottom flap 302 is not opened up and the upper flap 301 has been opened up. Thus, a hole 307 on the first surface 303 is shown in FIG. 3. The hole 307 allows a user to poke in fingers or to insert a tool to hook the air filter 306 out from the housing 7 of FIG. 1. The shapes, locations, and sizes of flaps 301 and 302 may vary. The number of perforated flaps may vary. It is understandable that perforated semi-circle flaps 301 and 302 also can be directly replaced by holes made by manufacturers. In one example, to reduce the size of hole/holes, an extra hook tool of FIG. 12 may be needed. Considering avoiding shaking off dust while punching a hole by pushing flaps 301 and 302 in, a pre-cut hole or pre-cut flap hole may be a better option.

In examples of the present disclosure, the first pulling element is a first recess region 362 (shown in dashed lines) opposite the first surface 303 of the first member 320 of the filter frame 305. The first pulling element is characterized by a non-accessible condition and an accessible condition. In the non-accessible condition, the first flap 301 is closed so that a front surface of the first flap 301 is co-planar with the first surface 303 of the first member 320 of the filter frame 305. In the accessible condition, the first flap 301 is opened so that one or more fingers of a hand of a user or a first tool 399 (similar to 1020 of FIG. 12) hooks the first recess region 362 to facilitate applying a force to the first recess region 362.

In examples of the present disclosure, the second pulling element is a second recess region 364 (shown in dashed lines) opposite the first surface 303 of the first member 320 of the filter frame 305. The second pulling element is characterized by a non-accessible condition and an accessible condition. In the non-accessible condition, the second flap 302 is closed so that a front surface of the second flap 302 is co-planar with the first surface 303 of the first member 320 of the filter frame 305. In the accessible condition, the second flap 302 is opened so that one or more fingers of another hand of a user or a second tool 1020 of FIG. 12 hooks the second recess region 364 to facilitate applying a force to the second recess region 364.

Figure 12:
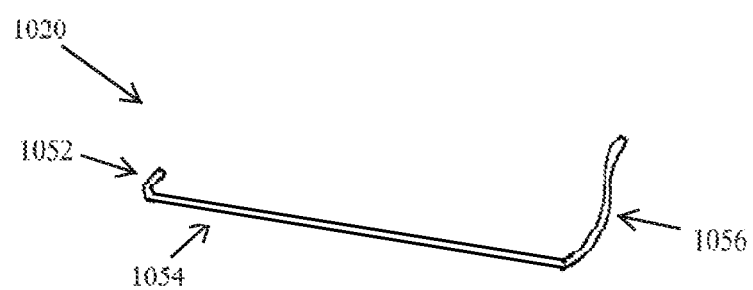
FIG. 12 is a perspective view of a letter L-shape dual hook tool in examples of the present disclosure.

The first tool 399 is similar to 1020 of FIG. 12. Each of the first tool 399 and the second tool 1020 of FIG. 12 comprises a first element 1052, a second element 1054, and a third element 1056. The second element 1054 is directly connected to the first element 1052. The second element 1054 is generally perpendicular to the first element 1052. In one example, the language "A is generally perpendicular to B" refers to an angle between A and B is in a range from 85 degrees to 95 degrees. In another example, the language "A is generally perpendicular to B" refers to an angle between A and B is in a range from 80 degrees to 100 degrees. The third element 1056 is directly connected to the second element 1054. The third element 1056 is generally perpendicular to the second element 1054. The third element 1056 is longer than the first element 1052.

In examples of the present disclosure, the first tool 399 is characterized by the non-accessible condition and the accessible condition. In the non-accessible condition, the first tool 399 is stored in a first pocket 372 behind the first flap 301. In the accessible condition, the first element of the first tool 399 directly contacts the first recess region 362. The third element of the first tool 399 is held by the hand of the user.

In examples of the present disclosure, the second tool 1020 of FIG. 12 is characterized by the non-accessible condition and the accessible condition. In the non-accessible condition, the second tool 1020 of FIG. 12 is stored in a second pocket 374 behind the first flap 301. In the accessible condition, the first element 1052 of the second tool 1020 of FIG. 12 directly contacts the second recess region 364. The third element 1056 of the second tool 1020 of FIG. 12 is held by the other hand of the user.

Figure 5:
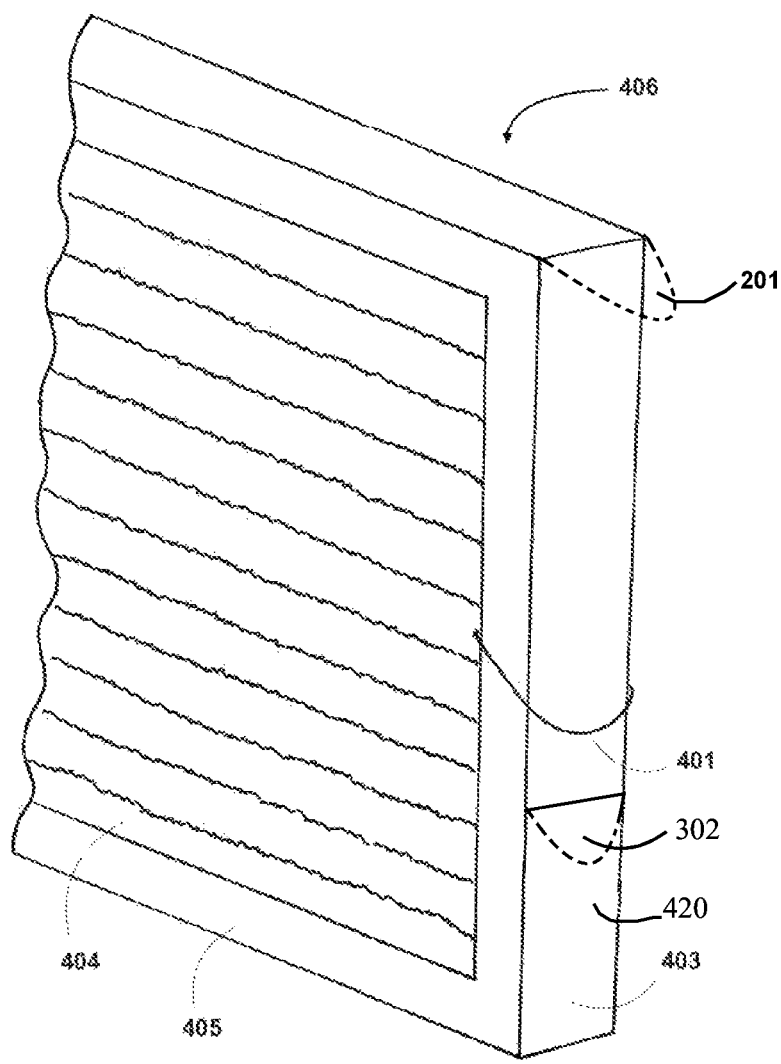
FIG. 5 is a partially perspective view of an air filter comprising a thread in examples of the present disclosure.

FIG. 5 is a partially perspective view of an air filter 406 comprising a thread 401 in examples of the present disclosure. The air filter 406 comprises a filter frame 405, a filter cloth 404, a plurality of wires 292 of FIG. 2, and a thread 401. The filter frame 405 comprises a first member 420. The first member 420 comprises a first surface 403.

A portion of the thread 401 is outside of the housing 7 of FIG. 1 for a user to pull out the air filter 406 out. The shape, size, and location of thread 401 may vary. The thread 401 may be made of a metal, an alloy or a plastic material. The number of thread 401 may vary.

In examples of the present disclosure, the air filter 406 further comprises the flap 201 of FIG. 2 and the perforated flap 302 of FIG. 3. In FIG. 5, the optional flap 201 and the optional, perforated flap 302 are shown in dashed lines.

In examples of the present disclosure, the first pulling element is a thread 401 surrounding a middle section of the first member 420 of the filter frame 405. In examples of the present disclosure, the thread 401 is attached to or run through the filter frame 405 or filter cloth 404 and the plurality of wires 292 of FIG. 2. The thread 401 is configured to be held and pulled by a hand of a user.

Figure 6:
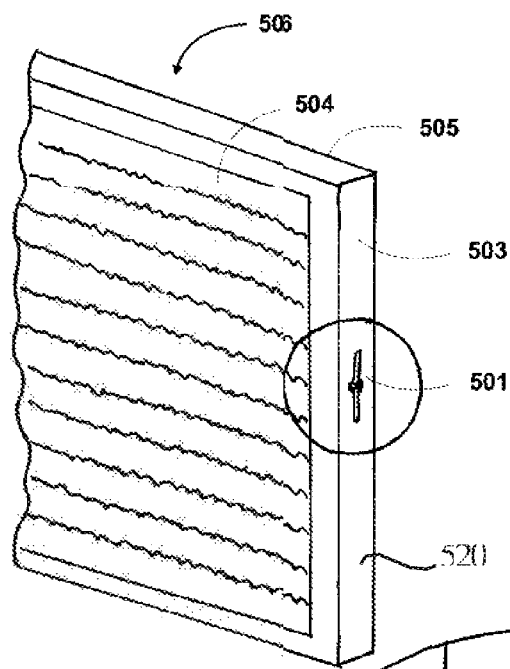
FIG. 6 is a partially perspective view of an air filter comprising a split pin type pulling element in examples of the present disclosure.
Figure 7:
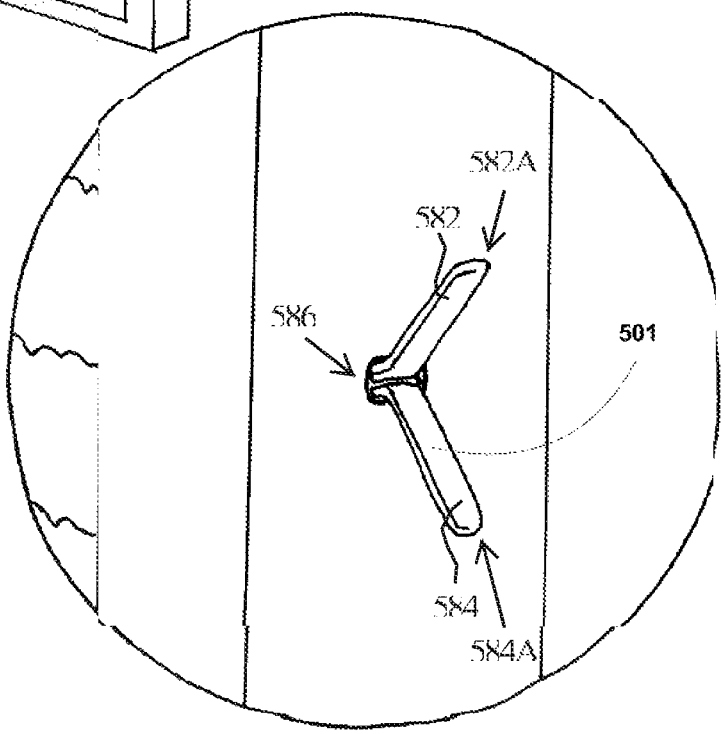
FIG. 7 is a partially perspective view of a partial view of FIG. 6 in examples of the present disclosure.

FIG. 6 is a partially perspective view of an air filter 506 comprising a split pin type pulling element 501 in examples of the present disclosure. FIG. 7 is a partially perspective view of a partial view of FIG. 6 in examples of the present disclosure. The air filter 506 comprises a filter frame 505, a filter cloth 504, a plurality of wires 292 of FIG. 2, and a split pin type pulling element 501. The filter frame 505 comprises a first member 520. The first member 520 comprises a first surface 503.

The split pin type pulling element 501 has 2 legs that both are pulled up in FIG. 6. The two legs 582 and 584 of the split pin type pulling element 501 can be pulled up and to be used as pulling elements to remove the air filter 506 from the housing 7 of FIG. 1. The size, shape, number of legs and location of the split pin type pulling element 501 may vary. In one example, the split pin type pulling element 501 may be made of a metal, an alloy, a cardboard, or a plastic material. In another example, the split pin type pulling element 501 may be made of other suitable material for manufacturing. A number of the split pin type pulling element 501 may vary. In another example, a split pin type pulling element 501 may contain only a single leg.

The split pin type pulling element 501 comprises a first leg 582, a second leg 584, and a holder 586. The second leg 584 is opposite to the first leg 582. The holder 586 holds the first leg 582 and the second leg 584 to the first surface 503 of the first member 520 of the filter frame 505. The split pin type pulling element 501 is characterized by a folded condition and an angled condition. In the folded condition, a distal end 582A of the first leg 582 contacts the first surface 503 of the first member 520 of the filter frame 505. A distal end 584A of the second leg 584 contacts the first surface 503 of the first member 520 of the filter frame 505. In the angled condition, the distal end 582A of the first leg 582 does not contact the first surface 503 of the first member 520 of the filter frame 505. The distal end 584A of the second leg 584 does not contact the first surface 503 of the first member 520 of the filter frame 505. The distal end 582A of the first leg 582 and the distal end 584A of the second leg 584 are configured to be held and pulled by a hand of a user. In one example, the angled condition is in a range from 80 degrees to 100 degrees. In another example, the angled condition is in a range from 70 degrees to 110 degrees.

Figure 8:
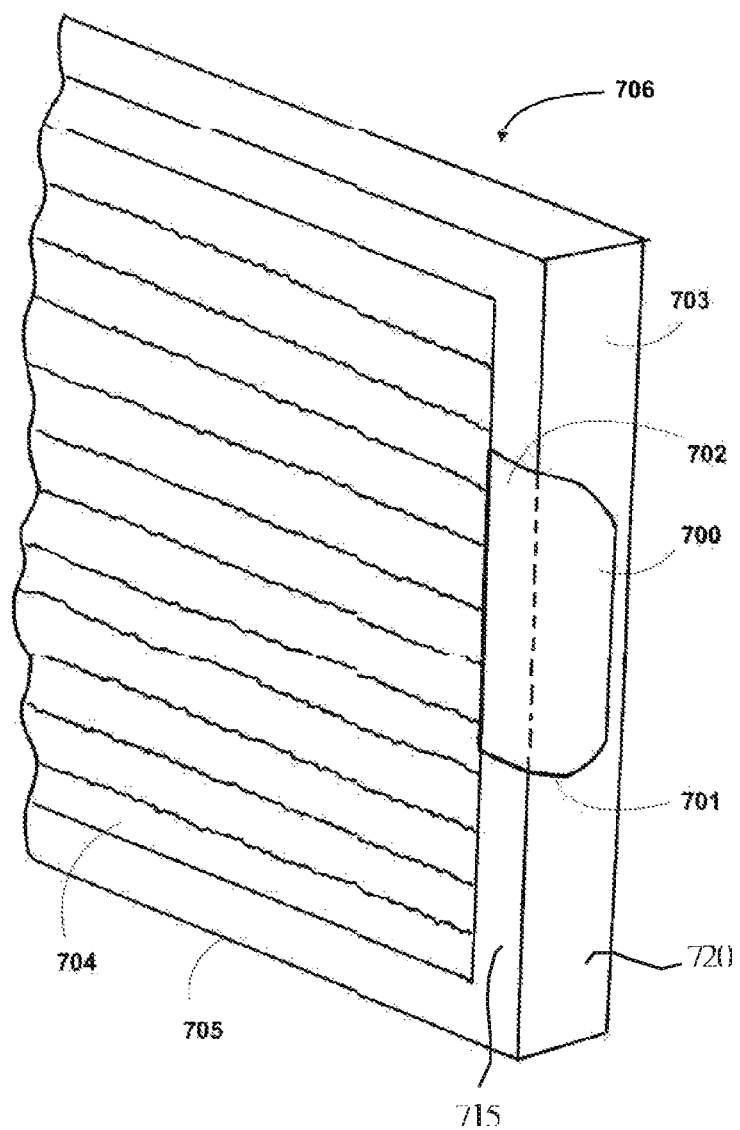
FIG. 8 is a partially perspective view of an air filter comprising a patch in examples of the present disclosure.

FIG. 8 is a partially perspective view of an air filter 706 comprising a patch 701 in examples of the present disclosure. The air filter 706 comprises a filter frame 705, a filter cloth 704, a plurality of wires 292 of FIG. 2, and a patch 701. The filter frame 705 comprises a first member 720. The first member 720 comprises a first surface 703.

The patch 701 contains 2 parts. The first section 702 of patch 701 is attached firmly on the filter frame 705. The second section 700 of patch 701 is originally folded along the first surface 703 and can be flapped up by users. The second section 700 of patch 701 can be used as a pulling element to remove the air filter 706 from the housing 7 of FIG. 1. The size, location, and shape of patch 701 may vary. A number of patch 701 may vary.

The patch 701 comprises a first section 702 and a second section 700 directly connected to the first section 702. A surface of the first section 702 is directly attached to a side surface 715 of the first member 720 of the filter frame 705. The second section 700 is configured to be held and pulled by a hand of a user.

Figure 9:
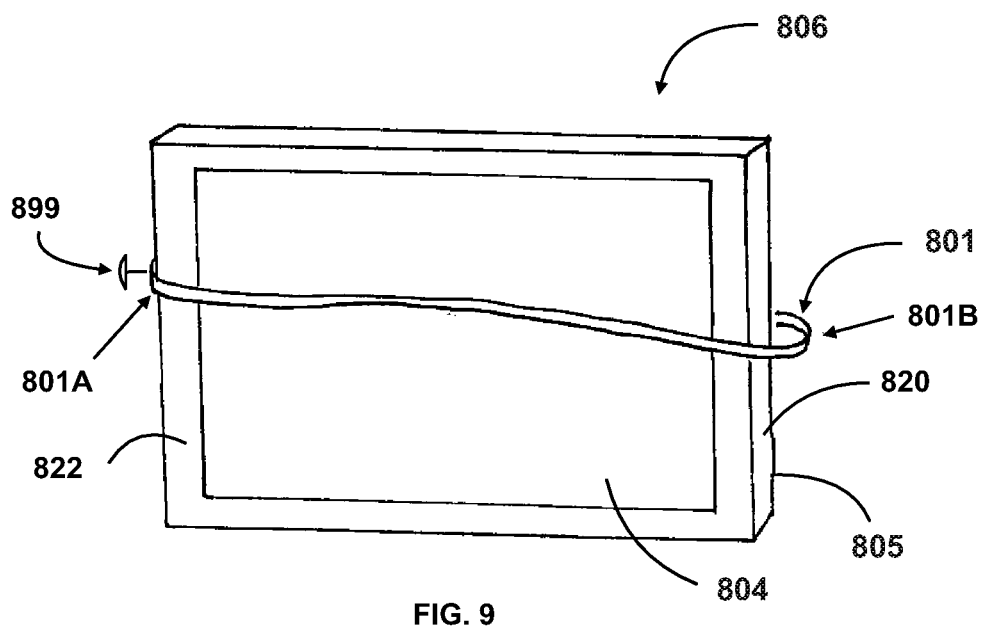
FIG. 9 is a perspective view of an air filter comprising a loop in examples of the present disclosure.

FIG. 9 is a perspective view of an air filter 806 comprising a loop 801 in examples of the present disclosure. The air filter 806 comprises a filter frame 805, a filter cloth 804, a plurality of wires 292 of FIG. 2, and a loop 801. The filter frame 805 comprises a first member 820 and a second member 822.

The filter loop 801 is wider than the air filter 806. So after the air filter 806 is inserted into the housing 7 of FIG. 1, part of the loop 801 will stay outside of the housing 7 of FIG. 1 and will allow a user to pull the part of the loop 801 to remove the air filter 806 from the housing 7 of FIG. 1. The shape, location, and size of the loop 801 may vary. In one example, the loop 801 may be made of paper, fiber or cloth material. In another example, the loop 801 may be made of other suitable materials. The loop 801 can be permanently attached on the air filter 806; or to be removable so it can be reused. In one example, an optional pin 899 (shown in dashed lines) is applied to attach the loop 801 to the filter frame 805. In another example, the loop 801 is attached to the wire. Then, it doesn't need to wrap the whole filter. The loop 801 can be tied to the wire and leave its tail outside of the housing 7 of FIG. 1. In FIG. 9, a ball 920 is attached to the tail 942 to keep the wire 940 staying outside of the housing 7 of FIG. 1 or frame 960 (part of the frame shown in dashed lines).

The loop 801 comprises a first end 801A and a second end 801B opposite the first end 801A. The first end 801A is attached to the second member 822 of the filter frame 805 by a pin 899. The second end 801B of the loop 801 is configured to be held and pulled by a hand of a user.

Figure 10:
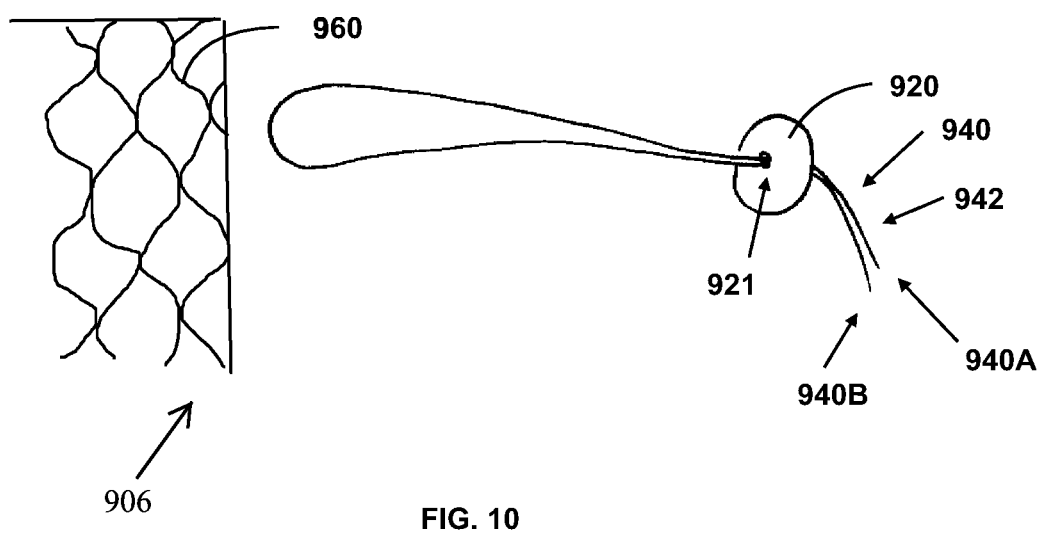
FIG. 10 is a partially perspective view of an air filter comprising a ball in examples of the present disclosure.

FIG. 10 is a partially perspective view of an air filter 906 comprising a ball 920 in examples of the present disclosure. A first end 940A and a second end 940B of a selected wire 940 of the plurality of wires 292 of FIG. 2 pass through a hole 921 of the ball 920. The ball 920 is configured to be held and pulled by a hand of a user. In examples of the present disclosure, instead of looping around the entire air filter 906, the user can have the ball being tied to a wire of filter before the installation. The ball 920 will keep itself outside of housing after the air filter is installed in position. Thus, the user can pull the ball and then drag the air filter out of housing. In examples of the present disclosure, insert about 2 cm (in a range from 1.9 cm to 2.1 cm) of the left end behind a wire line to make it as a circle. Then place the ball through the circle and pull the ball and make the circle smaller till the ball is tightened to the wire. Install the air filter, the ball will keep itself outside the housing and can be used as a pulling element. It is re-usable.

FIGS. 11A, 11B, and 11C show process steps of assembling the ball 920 of FIG. 10 in examples of the present disclosure. The ball 920 is operative to link with a wire of a wire net 1060. In one example, the wire of the wire net 1060 is close to the outside frame. The ball 920 keeps the loop in shape so that the loop outside of furnace housing can be served as a pulling element. It is understandable that the ball 920 can be made in other shapes. It can also be a knot made by the thread having similar size as the ball 920. The shortest diameter of the ball 920 is equal to or more than 0.5 cm.

FIG. 12 is a perspective view of a tool 1020 in examples of the present disclosure. In one example, the tool 1020 is a letter L-shape dual hook tool. In another example, the tool 1020 is removable. The tool 1020 comprises a first element 1052, a second element 1054, and a third element 1056. The second element 1054 is directly connected to the first element 1052. The second element 1054 is generally perpendicular to the first element 1052. In one example, the language "A is generally perpendicular to B" refers to an angle between A and B is in a range from 85 degrees to 95 degrees. In another example, the language "A is generally perpendicular to B" refers to an angle between A and B is in a range from 80 degrees to 100 degrees. The third element 1056 is directly connected to the second element 1054. The third element 1056 is generally perpendicular to the second element 1054. The third element 1056 is longer than the first element 1052.

In examples of the present disclosure, the first element 1052 of the tool 1020 is configured to directly contact a second surface 223 of FIG. 2 of the first member 220 of the filter frame 205. The third element 1056 of the tool 1020 is configured to be held and pulled by a hand of a user.

Figure 13:
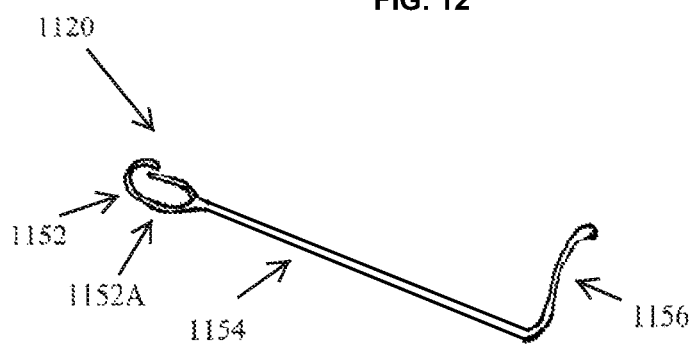
FIG. 13 is a perspective view of a dual hook tool with a self-lock hook in examples of the present disclosure.

FIG. 13 is a perspective view of a dual hook tool with a self-lock hook in examples of the present disclosure. In one example, the tool 1120 is a letter L-shape dual hook tool with a self-lock hook 1152A. In another example, the tool 1120 is removable. The tool 1120 comprises a first element 1152, a second element 1154, and a third element 1156. The first element 1152 comprises a self-lock hook 1152A. The second element 1154 is directly connected to the first element 1152. The third element 1156 is directly connected to the second element 1154. The third element is generally perpendicular to the second element 1154.

The self-lock hook 1152A of the first element 1152 of the tool 1120 is configured to engage with a selected wire of the plurality of wires 292 of FIG. 2. The third element 1156 of the tool 1120 is configured to be held and pulled by a hand of a user.

The dual hooks in FIG. 12 and FIG. 13 can be attached to the air filter shipped by a manufacture, or can be provided by users. The dual hooks may be disposable or may be reusable for other air filters.

Figure 14:
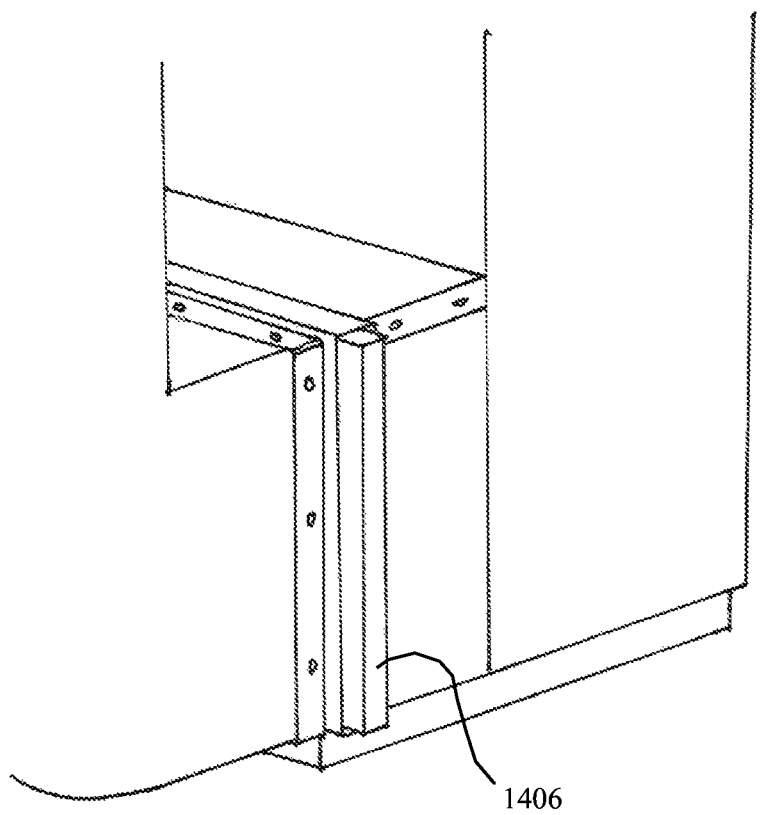
FIG. 14 is a partially perspective view of another air filter in examples of the present disclosure.

FIG. 14 is a partially perspective view of an air filter 1406. The air filter 1406 has a wider size than a conventional air filter. Conventional furnace air filters come in a range of sizes. Different brands and types of furnaces use different filters. Examples of conventional furnace air filter sizes are 10×20, 14×20, 16×24, 18×30, 12×12, 14×24, 16×25, 20×20, 12×20, 14×25, 18×18, 20×24, 12×24, 14×30, 18×20, 20×25, 12×30, 15×20, 18×24, 20×30, 12×36, 16×20, 18×25, 4×24, and 25×25 (unit in inch). The depth of a conventional furnace air filter is from 1 to 6 inches. In example, for 16 inch×20 inch type air filter, the conventional width 20-inch will be changed to 20.5-inch in the present disclosure (a wider size). In examples of the present disclosure, the added width is in a range from 0.1 inch to 1.5 inches. After air filter 1406 is installed, since it has wider size than conventional air filter, the extended width part will be out of the furnace housing in the installed condition. The extended width part of the air filter 1406 could be used to as a handle so as to pull the air filter 1406 out of furnace housing.

Those of ordinary skill in the art may recognize that modifications of the embodiments disclosed herein are possible. For example, a size of the ball 920 may vary. Other modifications may occur to those of ordinary skill in this art, and all such modifications are deemed to fall within the purview of the present invention, as defined by the claims.

The invention claimed is:

1. An air filter comprising:
a filter frame comprising: a first member comprising a first surface; a filter cloth attached to the filter frame; and a first pulling element attached to the first member of the filter frame; wherein the air filter is characterized by an installed condition in which a majority portion of the air filter is disposed in a housing except that the first surface is exposed from the housing; and an uninstalled condition in which another majority portion of the air filter is out of the housing; wherein the air filter further comprises a plurality of wires; wherein the filter frame further comprises a top member; and a bottom member; wherein the filter cloth is between the top member of the filter frame and the bottom member of the filter frame; and wherein the plurality of wires are between the top member of the filter frame and the bottom member of the filter frame.

2. The air filter of claim 1, wherein the first pulling element is a first flap comprising a first top flap end portion directly connected to the first surface of the first member of the filter frame; and a second top flap end portion opposite the first top flap end portion;
wherein the first pulling element is characterized by a folded condition in which the second top flap end portion contacts the first surface of the first member of the filter frame;
and angled condition in which the second top flap end portion does not contact the first surface of the first member of the filter frame; and the second top flap end portion configured to be held and pulled by a hand of a user.

3. The air filter of claim 1 further comprising a second pulling element being a second flap comprising a first bottom flap end portion directly connected to the first surface of the first member of the filter frame; and a second bottom flap end portion opposite the first bottom flap end portion; the second pulling element is characterized by a folded condition in which the second bottom flap end portion contacts the first surface of the first member of the filter frame; and angled condition in which the second bottom flap end portion does not contact the first surface of the first member of the filter frame; and the second bottom flap end portion is configured to be held and pulled by another hand of the user.

4. The air filter of claim 1, wherein the first pulling element is a first recess region opposite the first surface of the first member of the filter frame; wherein the first recess region is in a first pre-cut hole behind a first perforated flap;

and wherein the first perforated flap is configured to be poked in by a finger or a tool.

5. The air filter of claim 4, wherein the first perforated flap is of a semi-circle shape.

6. A method of using the air filter of-claim 4, the method comprising the steps of poking into the first perforated flap by the finger or the tool to hold the recess region; and from an installed condition, pulling the air filter out of a housing by the finger or the tool.

7. The air filter of claim 1, wherein the first pulling element is a thread surrounding a middle section of the first member of the filter frame; wherein the thread is configured to be held and pulled by a hand of a user.

8. The air filter of claim 1, wherein the first pulling element is of a split-pin structure; wherein the first pulling element comprises a first leg; a second leg opposite the first leg; and a holder holding the first leg and the second leg to the first surface of the first member of the filter frame; and wherein the first pulling element is characterized by a folded condition in which a distal end of the first leg contacts the first surface of the first member of the filter frame; and a distal end of the second leg contacts the first surface of the first member of the filter frame; and an angled condition in which the distal end of the first leg does not contact the first surface of the first member of the filter frame; the distal end of the second leg does not contact the first surface of the first member of the filter frame; and the distal end of the first leg and the distal end of the second leg are configured to be held and pulled by a hand of a user.

9. The air filter of claim 1, wherein the first pulling element is a loop; wherein the first pulling element comprises a first end attached to a second member of the filter frame by a pin; and a second end opposite the first end; and wherein the second end of the first pulling element is configured to be held and pulled by a hand of a user.

10. The air filter of claim 3, wherein the first pulling element comprises a ball; wherein a first end and a second end of a selected wire of a plurality of wires pass through a hole of the ball; and wherein the ball is configured to be held and pulled by a hand of a user.

* * * * *